(12) United States Patent
Reuche et al.

(10) Patent No.: US 11,006,449 B2
(45) Date of Patent: May 11, 2021

(54) METHOD FOR SELECTING A PRIMARY CHANNEL FOR WIRELESS COMMUNICATIONS

(71) Applicant: SAGEMCOM BROADBAND SAS, Rueil Malmaison (FR)

(72) Inventors: Anthony Reuche, Rueil Malmaison (FR); Massinissa Lalam, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/758,376

(22) PCT Filed: Oct. 29, 2018

(86) PCT No.: PCT/EP2018/079589
§ 371 (c)(1),
(2) Date: Apr. 22, 2020

(87) PCT Pub. No.: WO2019/086386
PCT Pub. Date: May 9, 2019

(65) Prior Publication Data
US 2020/0344800 A1    Oct. 29, 2020

(30) Foreign Application Priority Data
Oct. 31, 2017  (FR) ...................... 1760262

(51) Int. Cl.
*H04W 74/08* (2009.01)
*H04W 24/10* (2009.01)
(Continued)

(52) U.S. Cl.
CPC ....... *H04W 74/0808* (2013.01); *H04W 24/10* (2013.01); *H04W 28/0268* (2013.01); *H04W 48/16* (2013.01); *H04W 84/12* (2013.01)

(58) Field of Classification Search
CPC ............ H04W 74/0808; H04W 24/10; H04W 28/0268; H04W 48/16
See application file for complete search history.

(56) References Cited

U.S. PATENT DOCUMENTS

2009/0225876 A1* 9/2009 Sung ................. H04L 1/0045
375/260
2012/0051534 A1* 3/2012 Casalaina ............. H04M 1/575
379/218.01
(Continued)

FOREIGN PATENT DOCUMENTS

EP        3 026 975 A1    6/2016

OTHER PUBLICATIONS

Jan. 15, 2019 International Search Report issued in International Patent Application No. PCT/EP2018/079589.

*Primary Examiner* — Chi Ho A Lee
(74) *Attorney, Agent, or Firm* — Oliff PLC; R. Brian Drozd

(57) ABSTRACT

A wireless communication system includes a first access point managing a first wireless local area network and at least one second access point managing at least one respective wireless local area network. A CSMA/CA procedure is employed. The first access point is involved in a real-time sensitive transmission. Each access point implements an energy detection mechanism and a preamble detection mechanism in the context of the CSMA/CA procedure. The energy detection mechanism is implemented for accessing the primary channel and for accessing each secondary channel. The preamble detection mechanism is implemented for accessing the primary channel and optionally for accessing each secondary channel. A decision making unit instructs the first access point and each second access point to use the same primary communication channel. This (Continued)

improves the conditions under which the real-time sensitive transmission takes place.

13 Claims, 5 Drawing Sheets

(51) Int. Cl.
*H04W 28/02* (2009.01)
*H04W 48/16* (2009.01)
*H04W 84/12* (2009.01)

(56) References Cited

U.S. PATENT DOCUMENTS

| | | | |
|---|---|---|---|
| 2012/0057534 A1* | 3/2012 | Park | H04W 48/16 |
| | | | 370/329 |
| 2012/0176974 A1* | 7/2012 | Abraham | H04W 16/14 |
| | | | 370/329 |
| 2013/0288675 A1* | 10/2013 | Gassend | H04W 36/30 |
| | | | 455/434 |
| 2016/0142192 A1* | 5/2016 | Damnjanovic | H04L 5/0053 |
| | | | 370/329 |
| 2016/0174109 A1* | 6/2016 | Yerramalli | H04W 28/26 |
| | | | 370/329 |
| 2016/0316473 A1* | 10/2016 | Wang | H04W 74/0816 |
| 2016/0353360 A1* | 12/2016 | Lee | H04W 72/085 |
| 2017/0215082 A1* | 7/2017 | Hwang | H04W 88/08 |
| 2018/0152848 A1* | 5/2018 | Egner | H04W 76/15 |
| 2018/0338035 A1* | 11/2018 | Johnson | G06F 3/0488 |

\* cited by examiner

METHOD FOR SELECTING A PRIMARY CHANNEL FOR WIRELESS COMMUNICATIONS

The present invention relates to a method for selecting a primary channel in the context of communications of the CSMA/CA (Carrier Sense Multiple Access with Collision Avoidance) type in a wireless local network.

Establishing wireless local area networks WLANs offers great flexibility to the users of roaming communication devices, such as computers, tablets, smartphones, etc. Such WLAN networks are established by access points AP. Such wireless local area networks WLAN thus facilitate the interconnection of devices in a dwelling or an office, by providing wireless local connectivity in order to avoid having recourse to interconnection wiring.

Such access points AP may be integrated in residential gateways RGW made available by telecommunications operators to users who have taken out a subscription with them. Thus, apart from the local connectivity afforded by these WLAN networks, these users can also access services of wide area networks WAN, such as for example the internet, by means of these access points.

In a wireless local area network WLAN, a communication channel conveys information for the control and management of said wireless local area network WLAN. This channel is referred to as the primary channel, and generally serves to transmit beacons identifying the wireless local area network WLAN enabling in particular wireless terminals, referred to as stations, to synchronise themselves with the access point managing the wireless local area network WLAN. It is by means of this primary channel that essential operations of discovery of the network, association, etc are performed. One or more supplementary channels, referred to as secondary channels, for their part make it possible to increase the transmission rate.

Since the choice of this primary channel is critical to the functioning of a wireless local area network WLAN when there is interference, the prior art establishes that access points that manage wireless local area networks WLAN that interfere will seek to make their primary channels orthogonal with each other.

We shall consider the example of a wireless local area network WLAN of the Wi-Fi type, where the primary channel covers a band of 20 MHz. Secondary channels are typically defined to allow a higher transmission rate, in particular in the 5 GHz frequency band. We shall therefore consider a Wi-Fi network R1 compatible with the IEEE 802.11ac standard 80 MHz wide, with a primary channel C1 20 MHz wide, a secondary channel C2 20 MHz wide, and for an aggregate of secondary channels [C3-C4] 40 MHz wide. We shall also consider another Wi-Fi network R2 compatible with the IEEE 802.11ac standard, the coverage of which overlaps that of the Wi-Fi network R1. The access point of the Wi-Fi network R2 chooses its primary channel so as to avoid C1 and also C2, since said access point follows the procedure defined in paragraph § 10.39.2 in the IEEE 802.11ac-2013 amendment, leaving only C3 and C4 available. This is done so that, in the event of detection of mutual interference of the Wi-Fi networks R1 and R2, if said networks use dynamic-band transmissions, the two Wi-Fi networks R1 and R2 can fall back to transmissions 40 MHz wide (C1-C2 and C3-C4) and no longer interfere with each other (backoff mechanism). A dynamic-band transmission in Wi-Fi can, for the Wi-Fi network R1 for example, take place only on C1, on C1+C2 or on C1+C2+C3+C4, and not any other possible combinations supported in the standard.

In the wireless local area networks WLAN, in particular of the Wi-Fi type, access to the medium takes place by means of a procedure of the CSMA/CA type. Thus, when a device wishes to make a transmission, said device determines, at a given instant, whether the medium is free (transmission possible) or busy (transmission to be deferred). This approach is based on two procedures:

- a detection of energy: the medium is considered to be free if the power measured on a certain frequency band and over a certain length of time is below a first predefined threshold (e.g. −62 dBm measured on 20 MHz of band). This detection of energy is not related to any specific transmission technology.
- a detection of preamble: the medium is considered to be free if no significant signal, compatible with the WLAN technology used, is detected on a certain band over a certain length of time. A second predefined threshold is used to do this. In the IEEE 802.11 standard (the standard serving as a basis for Wi-Fi certified equipment), it is required that an IEEE 802.11 signal (of the type a/b/g/n/ac/ax) encoded with the most robust modulation and coding scheme used in the preamble be detectable and decodable for another item of IEEE 802.11 equipment if the power at which it is received is above −82 dBm measured on 20 MHz of band (sensitivity threshold). Decoding the preamble specified by the IEEE 802.11 standard makes it possible in fact to determine the length of the frame that contains this preamble and therefore the time during which the medium is considered to be occupied by said frame. This detection of preamble is therefore related to the transmission technology used.

For the primary channel of a wireless local area network WLAN to be considered to be free, it is necessary for the above two procedures, which are applied at the physical layer, to indicate that the medium is free. However, in order to facilitate the transmissions on the aggregated channels, only the energy detection procedure is required on the secondary channels.

Media-reservation procedures RTS/CTS (Request to Send/Clear to Send) can be implemented in order to indicate on all the channels (primary and secondary) that a transmission having an indicated duration will take place. However, these procedures are sometimes unsuited to the nature of the data streams transmitted. In particular, real-time sensitive traffics, based for example on the UDP (User Datagram Protocol), cannot afford to delay their transmissions with these procedures, in order not to degrade the user experience.

Thus there exist situations in which a first access point AP degrades real-time sensitive data transmissions made by a second access point AP, since the first access point AP implements only the energy detection on its secondary channel or channels, a said secondary channel corresponding to the primary channel of the second access point AP.

The communications in the wireless local area networks WLAN may therefore interfere with each other when they take place on the same frequency band while being on distinct primary channels. This situation is all the more detrimental when one or more interfering items of equipment are implementing burst transmissions that do not allow back-off mechanisms to balance the sharing of access to the medium. This is because such interfering items of equipment may not realize that the transmissions thereof are causing interference and, as the burst transmissions monopolize the medium, this may cause problems of degradation in perceived quality for services sensitive to the real-time aspect (e.g. IPTV, VoIP, etc.). This phenomenon is also amplified when the aforementioned media-reservation procedures of the RTS/CTS type are not implemented by the interfering item or items of equipment, and/or when the back-off mechanisms are not implemented by the interfering item or items of equipment themselves.

It is desirable to overcome these drawbacks of the prior art. It is thus desirable to provide a solution that strengthens the quality of transmission of real-time sensitive data in wireless local area networks WLAN as mentioned previously.

To this end, the invention relates to a method for selecting a primary communication channel in a wireless communication system comprising a first access point managing a first wireless local area network and at least one second access point managing at least one respective second wireless local area network, the transmissions in the first and second wireless local area networks being performed in accordance with a procedure of the CSMA/CA type, each access point among the first and second access points implementing an energy detection mechanism and a preamble detection mechanism in the context of the CSMA/CA procedure, the energy detection mechanism being implemented for accessing the primary communication channel and for accessing each secondary communication channel associated with the primary communication channel, the preamble detection mechanism being implemented for accessing the primary communication channel and optionally for accessing each secondary communication channel associated with the primary communication channel. The method is such that a decision making unit instructs the first access point and each second access point to use the same primary communication channel, when the first access point communicates with a station in the context of a transmission of real-time sensitive data with a quality of service superior to or equal to any quality of service of transmissions involving each second access point in the second wireless local area network thereof. Thus the quality of transmission of real-time sensitive data in the first wireless local area network is improved. This is because, by ensuring that the same primary communication channel is used, the decision making unit ensures that each second access point liable to interfere with the transmission of real-time sensitive data activates the preamble detection mechanism.

The invention also relates to a computer program product comprising instructions for implementing, by a processor, the above method, when said program is executed by said processor. The invention also relates to an information storage medium storing a computer program comprising instructions for implementing, by a processor, the above method, when said program is executed by said processor.

According to a particular embodiment, the method is such that the first access point monitors the quality of said transmission of real-time sensitive data, and triggers a primary-channel alignment procedure with the decision making unit when the quality of said transmission of real-time sensitive data drops below a predefined threshold. Thus the alignment of the primary channels is triggered as required (loss of quality) and the rest of the time the communication system can benefit from a use of orthogonal primary channels.

According to a particular embodiment, the method is such that, before triggering the primary-channel alignment procedure with the decision making unit, the first access point performs a dynamic band back-off and continues to monitor the quality of said transmission of real-time sensitive data. Thus, when the dynamic band back-off makes it possible to achieve the required quality for said transmission of real-time sensitive data, the communication system can benefit from a use of orthogonal primary channels.

According to a particular embodiment, the method is such that the first access point sends to the station a scanning request requiring the return of a first scanning report listing the wireless local area networks within radio range of said station, as well as the channels occupied by said wireless local area networks within radio range of said station, the first access point notifies the first scanning report to the decision making unit, and the decision making unit uses said first scanning report to determine which second wireless local area network or which second wireless local area networks are liable to interfere with said transmission of real-time sensitive data. Thus the first scanning report enables the decision making unit to more easily identify which second wireless local area networks are liable to interfere with said transmission of real-time sensitive data.

According to a particular embodiment, the method is such that the first scanning report supplies information on quality of service of a dominant data traffic on each wireless local area network within radio range of said station. Thus the decision making unit does not need to be connected to each access point in charge of a wireless local area network that may interfere with said transmission of real-time sensitive data.

According to a particular embodiment, the method is such that the first access point performs a scanning of the secondary communication channels thereof and lists the wireless local area networks within radio range of said first access point in a second scanning report, the first access point notifies the second scanning report to the decision making unit, and the decision making unit uses said second scanning report to determine which second wireless local area network or which second wireless local area networks are liable to interfere with said transmission of real-time sensitive data. Thus the second scanning report enables the decision making unit to more easily identify which second wireless local networks are liable to interfere with said transmission of real-time sensitive data.

According to a particular embodiment, the method is such that the second scanning report supplies information on quality of service of a dominant data traffic on each wireless local area network within radio range of said first access point. Thus the decision making unit does not need to be connected to each access point in charge of a wireless local network that may interfere with said transmission of real-time sensitive data.

According to a particular embodiment, the method is such that, when the decision making unit determines that a plurality of second wireless local area networks are liable to interfere with said transmission of real-time sensitive data, the decision making unit requires the first access point to perform an iterative primary-channel discovery procedure wherein the first access point tests possible primary communication channels by monitoring the quality of said transmission of real-time sensitive data in order to determine which primary communication channel is appropriate. Thus it is possible to dynamically discover which primary communication channel to use.

According to a particular embodiment, the method is such that the decision making unit collects scanning reports provided by all the access points that are connected thereto, the decision making unit creates a list L of all the second access points that detect the first access point with a power level above a predefined threshold, the decision making unit instructs all the second access points in the list L to use, as the primary communication channel, the same channel as the primary communication channel of the first access point, and, at each change of primary communication channel of the first access point, the first access point informs the decision making unit of the primary communication channel newly selected, and the decision making unit instructs all the second access points in the list L to use, as the primary communication channel, the primary communication channel newly selected by the first access point. Thus, when the first wireless local area network is identified as a regular support of such a transmission of real-time sensitive data, the decision making unit quickly and effectively ensures that each second access point liable to interfere with said transmission of real-time sensitive data activates the preamble detection mechanism.

According to a particular embodiment, the method is such that the first and second wireless local area networks are of the Wi-Fi type.

The invention also relates to a decision making unit configured to perform a primary communication channel selection in a wireless communication system comprising a first access point managing a first wireless local area network and at least one second access point managing at least one respective second wireless local area network, transmissions in the first and second wireless local area networks being performed in accordance with a procedure of the CSMA/CA type, each access point among the first and second access points implementing an energy detection mechanism and a preamble detection mechanism in the context of the CSMA/CA procedure, the energy detection mechanism being implemented in order to access the primary communication channel and to access each secondary communication channel associated with the primary communication channel, the preamble detection mechanism being implemented in order to access the primary communication channel and optionally to access each secondary communication channel associated with the primary communication channel. The decision making unit is such that it comprises means for instructing the first access point and each second access point to use the same primary communication channel, when the first access point communicates with a station in the context of a transmission of real-time sensitive data with a quality of service superior to or equal to any quality of service of transmissions involving each second access point in the second wireless local area network thereof.

The features of the invention mentioned above, as well as others, will emerge more clearly from a reading of the following description of an example embodiment, said description being made in relation to the accompanying drawings, among which:

There is hereinafter considered a wireless communication system comprising a first access point AP1 111 managing a first wireless local area network WLAN1 121 and at least one second access point AP2 112 managing at least one respective wireless local area network WLAN2 112. The wireless communication system is such that the transmissions in the first WLAN1 121 and second WLAN1 122 wireless local area networks are performed in accordance with a procedure of the CSMA/CA type. The first WLAN1 121 and second WLAN1 122 wireless local area networks are preferentially of the Wi-Fi type (or based on the IEEE 802.11 standard).

The transmissions in the first WLAN1 121 and second WLAN1 122 local area networks use the same frequency band, divided into channels, from which a primary channel and at least one secondary channel are selected. Each access point among the first AP1 111 and second AP2 112 access points implements an energy detection mechanism and a preamble detection mechanism (as mentioned in the introductory part of the present document) in the context of the CSMA/CA procedure, the energy detection mechanism being implemented for accessing the primary channel and for accessing each secondary channel associated with the primary channel, the preamble detection mechanism being implemented in order to access the primary channel and optionally for accessing each secondary channel associated with the primary channel. The first access point AP1 111 communicates with a station STA1 131 in the context of a transmission of real-time sensitive data (e.g. IPTV, VoIP, etc.). Various arrangements of the communication system are possible, as presented below in relation to FIGS. 1A to 1D. When the quality of service QoS of this transmission of real-time sensitive data is superior to or equal to any quality of service of transmissions involving each second access point AP2 112 in the second wireless local area network WLAN2 122 thereof, a decision making unit DMU 100 instructs the first access point AP1 111 and each second access point AP2 112 to use the same primary communication channel. Various embodiments according to a first approach are described hereinafter in relation to FIGS. 3 to 7, and another embodiment according to a second approach is described hereinafter in relation to FIG. 8.

Figure 1A:
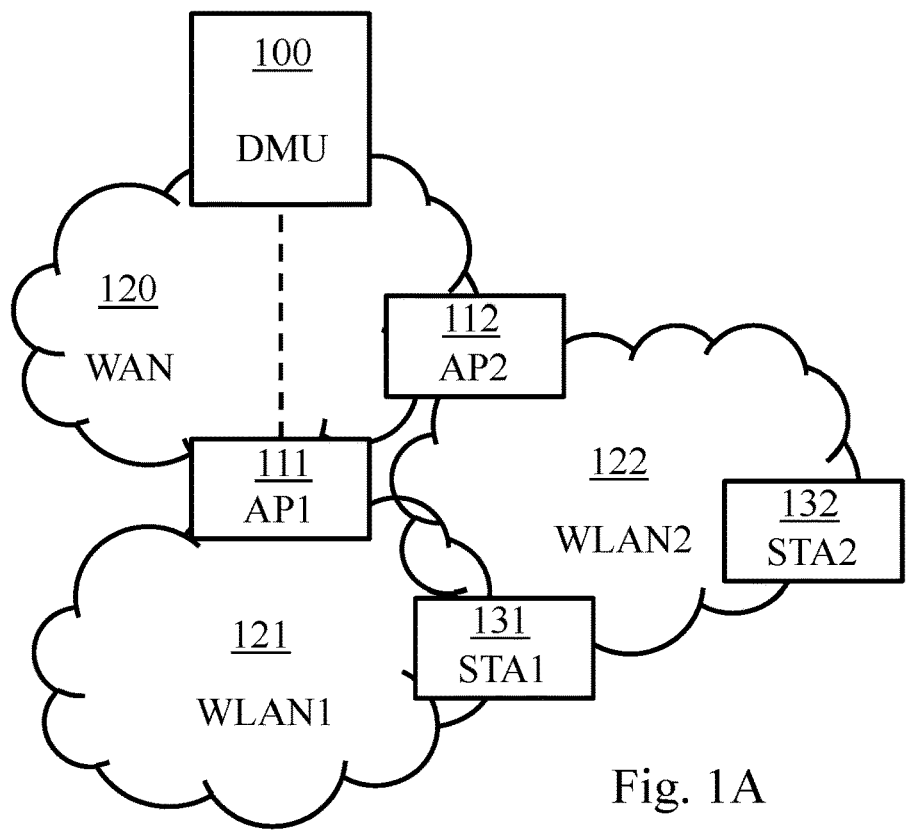
FIG. 1A illustrates schematically a first communication system wherein the present invention can be implemented.

FIG. 1A illustrates schematically a first communication system wherein the present invention can be implemented. In this first system, the first access point AP1 111 and each second access point AP2 112 are connected to a wide area network WAN 120, in order to provide internet access to stations connected to their respective wireless local area network WLAN. Thus the station STA1 receives for example an audiovisual (and therefore real-time sensitive) stream coming from the wide area network WAN 120, via the first access point AP1 111, and a station STA2 accesses websites by means of the HTTP protocol (HyperText Transfer Protocol) via a said second access point AP2 112. For example, the station STA1 is a set-top box STB and the station STA2 a tablet. In the context of FIG. 1A, the decision making unit DMU 100 is connected solely to the first access point AP1 111, via the wide area network WAN 120. It should be noted that the decision making unit DMU 100 may in a variant be connected to the first access point AP1 111 via means other than a wide area network (such as the internet), for example a wireless connection of the Bluetooth type, or an Ethernet connection, or any other cable, optical or radio communication link.

Figure 1B:
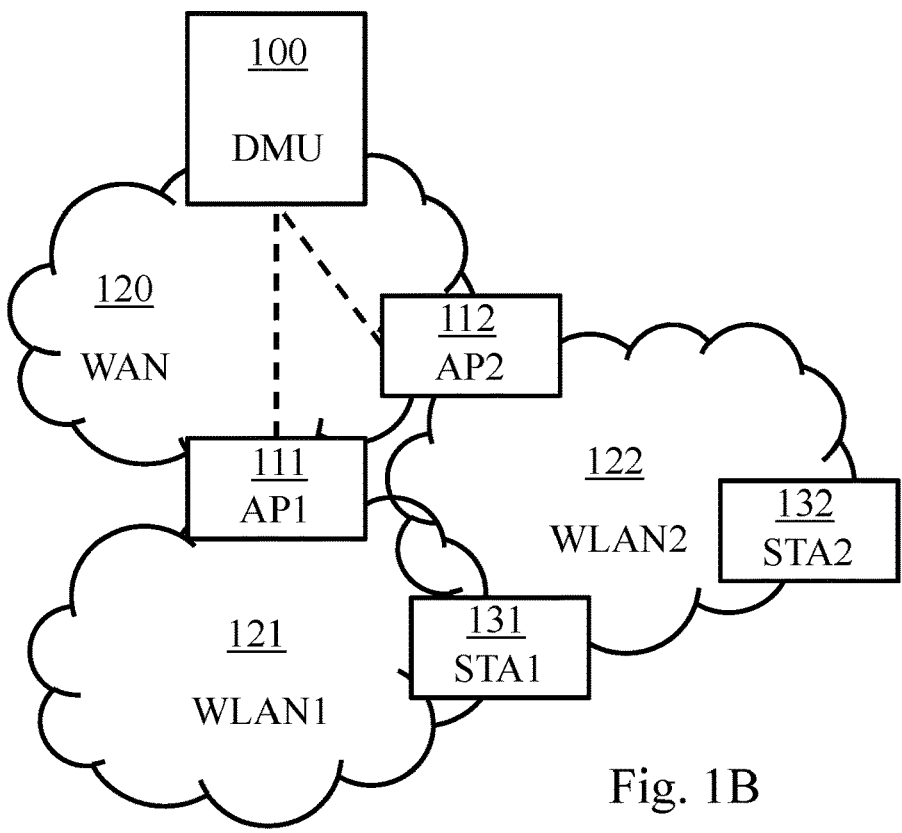
FIG. 1B illustrates schematically a second communication system wherein the present invention can be implemented.

FIG. 1B illustrates schematically a second communication system wherein the first invention can be implemented. The second communication system differs from the first communication system in FIG. 1A in that the decision making unit DMU 100 is furthermore connected to each second access point AP2 112, via the wide area network WAN 120. It should be noted that the decision making unit DMU 100 may in a variant be connected to each second access point AP2 112 via means other than a wide area network, for example a wireless connection of the Bluetooth type, or an Ethernet connection, or any other cable, optical or radio communication link.

Figure 1C:
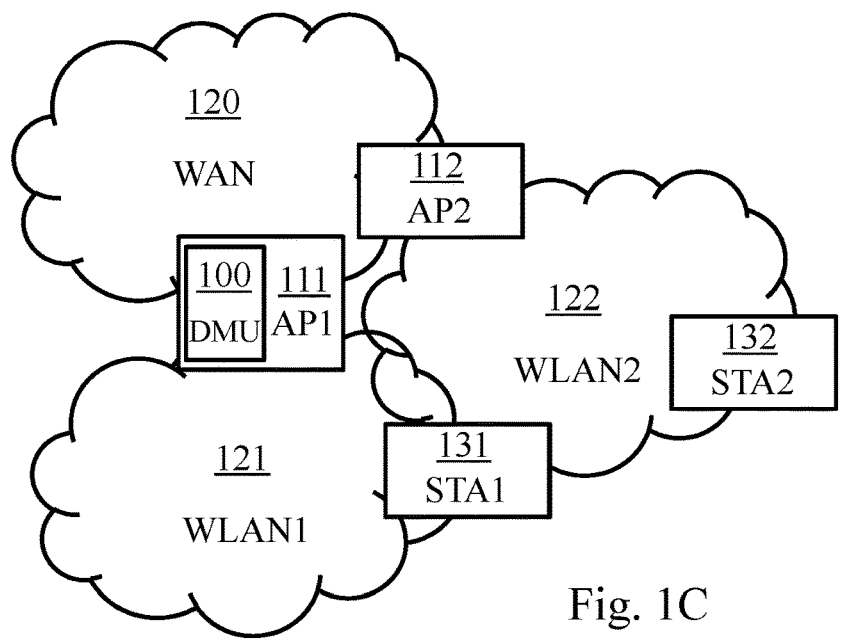
FIG. 1C illustrates schematically a third communication system wherein the present invention can be implemented.

FIG. 1C illustrates schematically a third communication system wherein the present invention can be implemented. The third communication system differs from the first communication system in FIG. 1A in that the decision making unit DMU 100 is integrated in the first access point AP1 111.

Figure 1D:
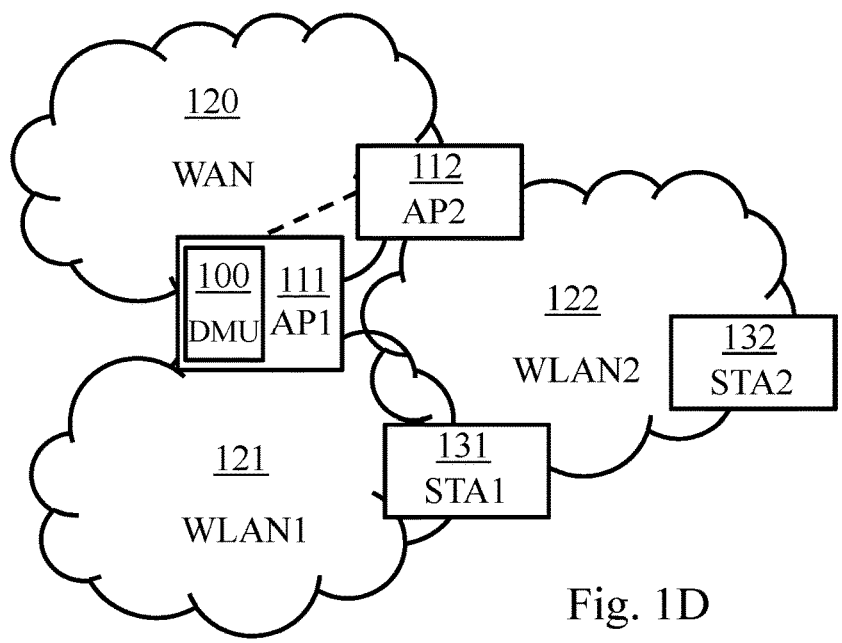
FIG. 1D illustrates schematically a fourth communication system wherein the present invention can be implemented.

FIG. 1D illustrates schematically a fourth communication system wherein the present invention can be implemented. The fourth communication system differs from the third communication system in FIG. 1C in that the decision making unit DMU 100 is here connected to each second access point AP2 112, via the wide area network WAN 120. It should be noted that the decision making unit DMU 100 may in a variant be connected to each second access point AP2 112 via means other than a wide area network, for example a wireless connection of the Bluetooth type, or an Ethernet connection, or any other cable, optical or radio communication link.

Figure 2:
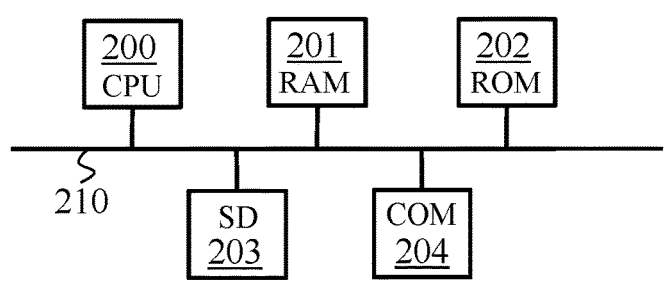
FIG. 2 illustrates schematically an example of hardware architecture of a decision making unit of the communication system.

FIG. 2 illustrates schematically an example of hardware architecture of the decision making unit DMU 100. The example of hardware architecture in FIG. 2 is also applicable to the access points AP1 111 and AP2 112.

The example of hardware architecture presented comprises, connected by a communication bus 210: a processor CPU (central processing unit) 200; a random access memory RAM 201; a read only memory ROM 202; a storage unit or a storage medium reader, such as an SD (Secure Digital) card reader 203 or a hard disk HDD (hard disk drive); and at least one communication interface COM 204.

When the hardware architecture represents the decision making unit DMU 100, the communication interface COM 204 enables the decision making unit DMU 100 to communicate with the first access point AP1 111 and optionally with each second access point AP2 112.

When the hardware architecture represents the first access point AP1 111, the communication interface COM 204 enables the first access point AP1 111 to communicate with the decision making unit DMU 100. When the hardware architecture represents a said second access point AP2 112, the communication interface COM 204 optionally enables said second access point AP2 112 to communicate with the decision making unit DMU 100.

The processor CPU 200 is capable of executing instructions loaded in the RAM memory 201 from the ROM memory 202, from an external memory (such as an SD card), from a storage medium (such as a hard disk HDD), or from a communication network (such as the wide area network WAN 120). On powering-up, the processor CPU 200 is capable of reading instructions from the RAM memory 201 and executing them. These instructions form a computer program causing the implementation, by the processor CPU 200, of all or some of the algorithms and steps described below in relation to the device that said hardware architecture represents.

Thus all or some of the algorithms and steps described below can be implemented in software form by the execution of a set of instructions by a programmable machine, such as a DSP (digital signal processor) or a microcontroller or a processor. All or some of the algorithms and steps described hereinafter may also be implemented in hardware form by a machine or a dedicated component, such as an FPGA (field-programmable gate array) or an ASIC (application-specific integrated circuit). Thus the decision making unit DMU 100, as well as the access points AP1 111 and AP2 112, comprise the electronic circuitry suitable for implementing the algorithms and steps described hereinafter.

It should be noted that the stations connected to one of said wireless local area networks WLAN1 121 and WLAN2 122 may follow the same hardware architecture.

Figure 3:
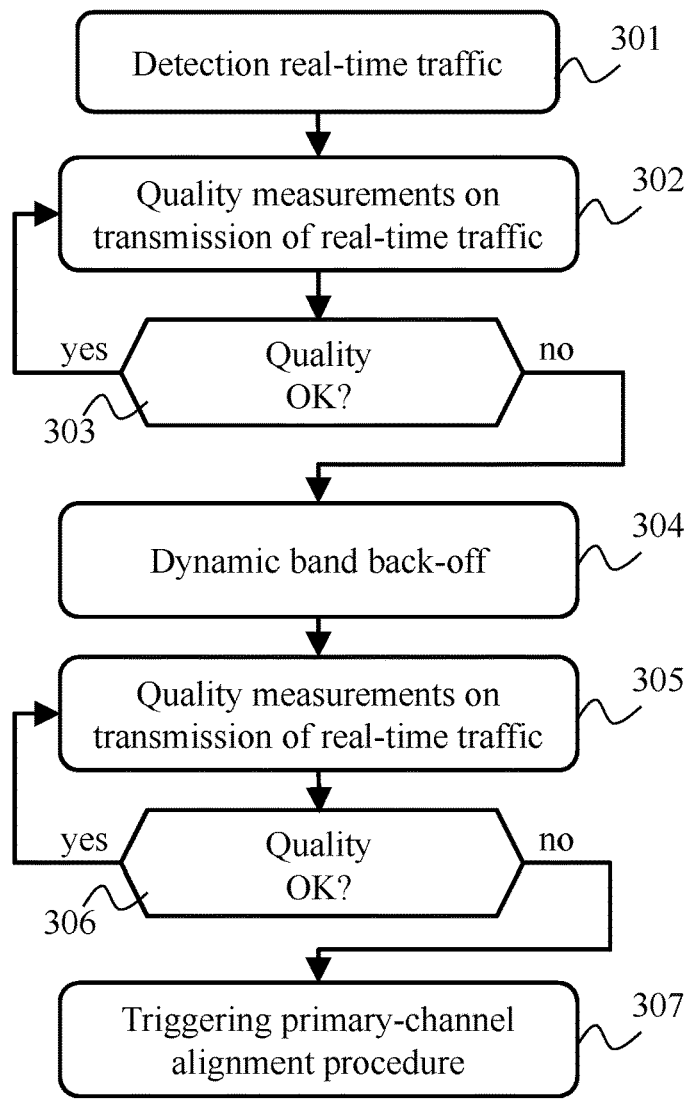
FIG. 3 illustrates schematically a decision algorithm for triggering a primary-channel alignment procedure, the algorithm being implemented by an access point of the communication system.

FIG. 3 illustrates schematically a decision algorithm for triggering a primary-channel alignment procedure, the algorithm being implemented by the first access point AP1 111.

In a step 301, the first access point AP1 111 detects that a real-time sensitive data traffic is established between the station STA1 131 and said first access point AP1 111 (whatever the direction of this traffic). For example, the access point AP1 111 determines that said traffic is real-time sensitive according to quality of service QoS information contained in a TID (Traffic Identifier) field defined in the IEEE 802.11 headers. Other fields may serve to identify the type of traffic in other WLAN technologies based on an access to the medium by a procedure of the CSMA/CA type as previously described.

In a step 302, the first access point AP1 111 performs measurements of transmission quality of said real-time sensitive data traffic. For example, the first access point AP1 111 relies on the quantity of retransmissions with respect to the quantity of acknowledgements occurring at the MAC (Medium Access Control) layer.

In a step 303, the first access point AP1 111 checks whether the transmission quality is satisfactory for said real-time sensitive data traffic. If the transmission quality is degraded below a predefined threshold (e.g. a proportion of retransmissions above a predefined threshold during a predefined period), which signifies that the transmission quality for said real-time sensitive data traffic is not satisfactory with the modulation and coding scheme MCS and the number of spatial streams used, a step 304 is performed; otherwise step 302 is repeated, with optionally a predefined waiting period.

In step 304, the first access point AP1 111 performs a dynamic band back-off, that is to say the first access point AP1 111 will attempt to reduce the quantity of the secondary channels thereof, until possibly it keeps only the primary channel if the latter suffices for the transmission of the real-time sensitive data traffic.

In a step 305, the first access point AP1 111 continues to make measurements of transmission quality of said real-time sensitive data traffic.

In a step 306, the first access point AP1 111 checks whether the transmission quality is satisfactory for said real-time sensitive data traffic following the dynamic band back-off. If the transmission quality degrades below a predefined threshold (e.g. a proportion of retransmissions above a predefined threshold during a predefined period), this signifies that the transmission quality for said real-time sensitive data traffic is not satisfactory, and a step 307 is performed; otherwise step 305 is repeated, with optionally a predefined waiting period.

In step 307, the first access point AP1 111 triggers the primary-channel alignment procedure. The first access point AP1 111 notifies the decision making unit DMU 100 of the need for alignment of primary channels. The first access point AP1 111 informs the decision making unit DMU 100 of the primary channel used by said first access point AP1 111, as well as the quality of service QoS of the real-time sensitive data traffic concerned.

Figure 4:
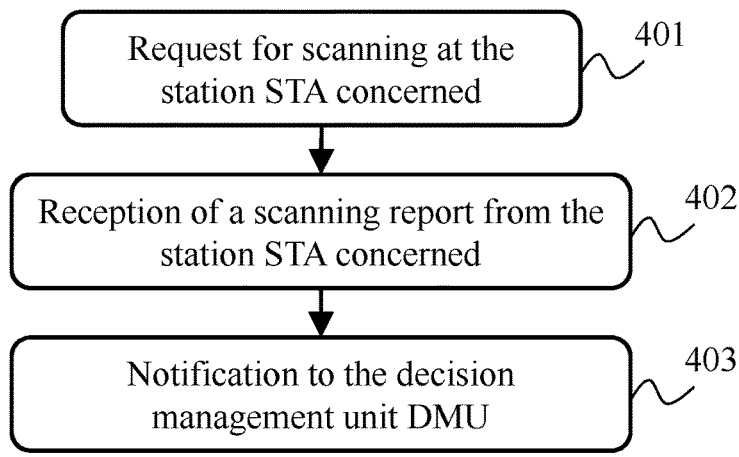
FIG. 4 illustrates schematically a scanning-data collection algorithm used by a station of the communication system, the algorithm being implemented by said access point.

FIG. 4 illustrates schematically a scanning-data collection algorithm used by the station STA1 131, the algorithm being implemented by the first access point AP1 111. The algorithm in FIG. 4 can be triggered by the first access point AP1 111 on its own initiative following step 307, or on instruction from the decision making unit DMU 100 after notification of the need for alignment of primary channels, insofar as the station STA 131 supports it.

In a step 401, the first access point AP1 111 sends a scanning request to the station STA 131. The scanning request requests the station STA 131 to return a scanning report listing the wireless local area networks WLAN within radio range of the station STA 131, as well as the channels occupied by these wireless local area networks WLAN. It is possible to use beacon-measurement request frames, as defined in the IEEE 802.11k amendment, which enables a station STA to report to the access point AP to which said station STA is connected which are the other wireless local area networks WLAN that said station STA detects, with an indication of the primary channel indicated, as well as the associated RSSI (Received Signal Strength Indicator) field level. The beacons sent by the access points AP managing these wireless local area networks WLAN may be used.

In a particular embodiment, the station STA 131 enhances the scanning report by indicating, by channel, an identifier of the wireless local area network WLAN that occupies the major part of the time on an observation window of predefined duration (dominant traffic). In the wireless local area networks WLAN of the Wi-Fi type, the identifier of the wireless local area network WLAN is BSSID (Basic Service Set Identifier) information available in the MAC headers of any data transmission. In addition, the station STA 131 enhances the scanning report by indicating the quality of service QoS of the dominant traffic on the channel concerned. This is because an observation of the transmission that most occupies a channel makes it possible to determine the quality of service QoS of the dominant traffic concerned, either by analysis of time separating each frame of said transmission and a correlation with mean values of each possible class of traffic, or by decoding of the TID field (as previously described).

In a step 402, the first access point AP1 111 receives, from the station STA 131, the scanning report requested at step 401.

In a step 403, the first access point AP1 111 notifies, to the decision making unit DMU 100, the scanning report received at step 402. The decision making unit DMU 100 thus has knowledge of the wireless local area networks WLAN liable to interfere with the transmission of the real-time sensitive data traffic in question.

In a variant embodiment, the first access point AP1 111 requests the station STA 131 to send it such scanning reports periodically, so as to have available the required information in the event of a need for alignment of primary channels.

Figure 5:
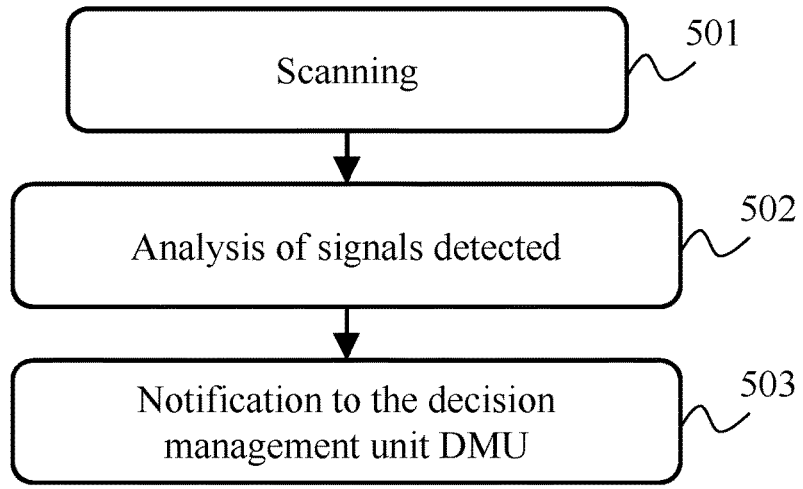
FIG. 5 illustrates schematically a scanning-data collection algorithm used by said access point.

FIG. 5 illustrates schematically a scanning-data collection algorithm implemented by the first access point AP1 111. The algorithm in FIG. 5 is triggered in addition to the one in FIG. 4, and is particularly useful when the first access point AP1 111 has not succeeded in obtaining the scanning report by the station STA 131, either because the station STA 131 does not implement a mechanism for generating such scanning reports, or because the station STA 131 has not (through a lack of propitious radio conditions) succeeded in transmitting any scanning report to the first access point AP1 111.

In a step 501, the first access point AP1 111 performs a scanning of the secondary channels thereof, in order to detect transmissions made on said channels.

In a step 502, the first access point AP1 111 analyses the radio signals detected during the scanning of step 501. The first access point AP1 111 thus lists the wireless local area networks WLAN within radio range of said first access point AP1 111, as well as the channels occupied by these wireless local area networks WLAN.

In a particular embodiment, the first access point AP1 111 determines, by channel, an identifier of the wireless local area network WLAN that occupies the major part of the time on an observation window of predefined duration (dominant traffic). The first access point AP1 111 furthermore determines the quality of service QoS of the dominant traffic on the channel concerned, either by analysis of time separating each frame of said dominant traffic and a correlation with mean values of each possible class of traffic, or by decoding of the TID field (as previously described).

In a step 503, the first access point AP1 111 generates a scanning report (as the station STA 131 would have done) and notifies it to the decision making unit DMU 100. The decision making unit DMU 100 thus has an estimation of the wireless local area networks WLAN liable to interfere with the transmission of the real-time sensitive data traffic in question.

Figure 6:
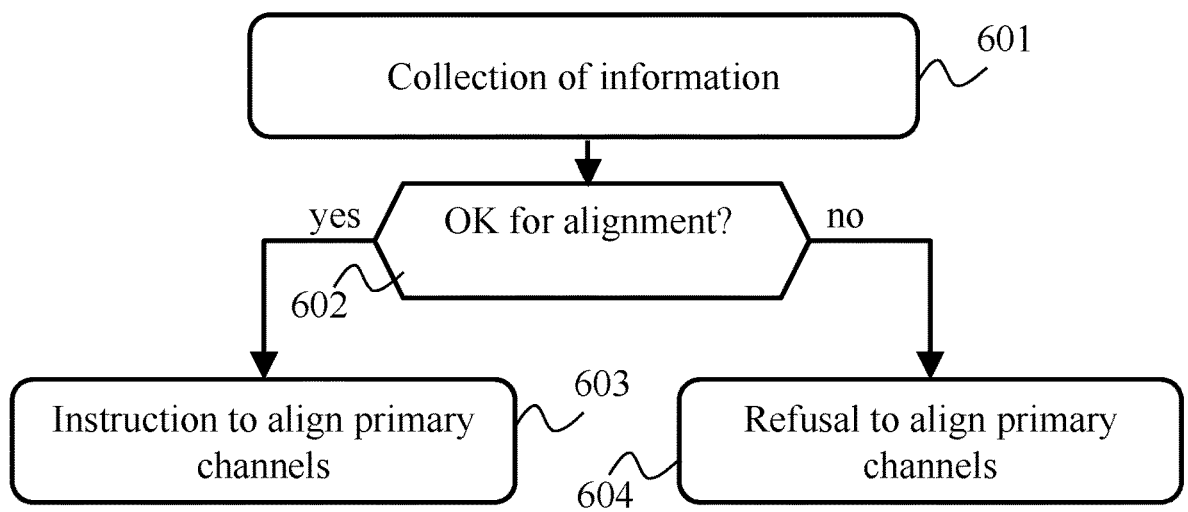
FIG. 6 illustrates schematically a decision algorithm for alignment or not of primary channels, the algorithm being implemented by said decision making unit.

FIG. 6 illustrates schematically a decision algorithm for alignment or not of primary channels, the algorithm being implemented by the decision making unit DMU 100.

In a step 601, the decision making unit DMU 100 collects information relating to the need for alignment of primary channels notified by the first access point AP1 111 at step 307.

When the decision making unit DMU 100 is connected to the second access point or points AP2 112 (FIG. 1B or 1D), the decision making unit DMU 100 has the possibility of being informed of the primary channels used by the access points AP that are connected thereto, as well as of the type of dominant traffic (real-time sensitive or not) in which said access points AP are involved, and of the quality of service QoS of said traffic. By being notified of the scanning report made by the station STA1 131 (step 403) and/or of the scanning report made by the first access point AP1 111 (step 503), the decision making unit DMU 100 determines which second access point AP2 112 liable to interfere with the real-time sensitive data traffic to which the need for alignment of primary channels notified by the first access point AP1 111 at step 307 relates. The decision making unit DMU 100 then determines, for each second access point AP2 111 liable to interfere, what the quality of service QoS of the dominant traffic is, according to the information received from said second access point AP2 112.

When the decision making unit DMU 100 is not connected to the second access point or points AP2 112 (FIG.

1A or 1C), the decision making unit DMU 100 relies solely on the scanning report made by the station STA1 131 (notified at step 403) and/or the scanning report made by the first access point AP1 111 (notified at step 503). These scanning reports must then have been enhanced by the quality of service information QoS on dominant traffic. These scanning reports are then used by the decision making unit DMU 100 in order to determine, firstly each second access point AP2 112 liable to interfere with the real-time sensitive data traffic to which the requirement for alignment of primary channels notified by the first access point AP1 111 at step 307 relates, and secondly which is its primary channel and the quality of service QoS of its dominant traffic.

In the above two cases, the decision making unit DMU 100 next adopts solely each second access point AP2 liable to interfere, the dominant-traffic quality of service QoS of which is inferior to that of the real-time sensitive data traffic to which the requirement for alignment of primary channels notified by the first access point AP1 111 at step 307 relates. If there remains only one of them, the decision making unit DMU 100 instructs the first access point AP1 111 to use such a channel as the primary channel, indicating to it the primary channel used by the second access point AP2 remaining. If none of them remains, the decision making unit DMU 100 communicates to the first access point AP1 111 a refusal to align primary channels. If there remains more than one of them, the decision making unit DMU 100 instructs the first access point AP1 111 to perform an iterative discovery procedure on the primary channels used by the second access points AP2 remaining. The iterative discovery procedure is detailed hereinafter in relation to FIG. 7. The decision making unit DMU 100 indicates to the first access point AP1 111 which are the channels on which the iterative discovery procedure must take place, or in an equivalent manner which are the channels on which the iterative discovery procedure must not take place. The decision making unit DMU 100 thus ensures that the first access point AP1 111 will not align its primary channel on that of a second access point AP2 112 the dominant traffic of which has a quality of service QoS superior to that of the real-time sensitive data traffic to which the requirement for alignment of primary channels notified by the first access point AP1 111 at step 307 relates.

Thus, in a step 602, the decision making unit DMU 100 checks whether, according to the information collected, an alignment of primary channels is possible, in the light of the qualities of service QoS of the relevant traffics. If such is the case, a step 603 is performed; otherwise a step 604 is performed.

In step 603, the decision making unit DMU 100 instructs the first access point AP1 111 to perform an alignment of primary channels. As indicated above, either the decision making unit DMU 100 supplies the primary-channel information to be used by the first access point AP1 111, or the decision making unit DMU 100 requests the execution of the iterative discovery procedure.

In step 604, the decision making unit DMU 100 communicates to the first access point AP1 111 a refusal to align primary channels.

Figure 7:
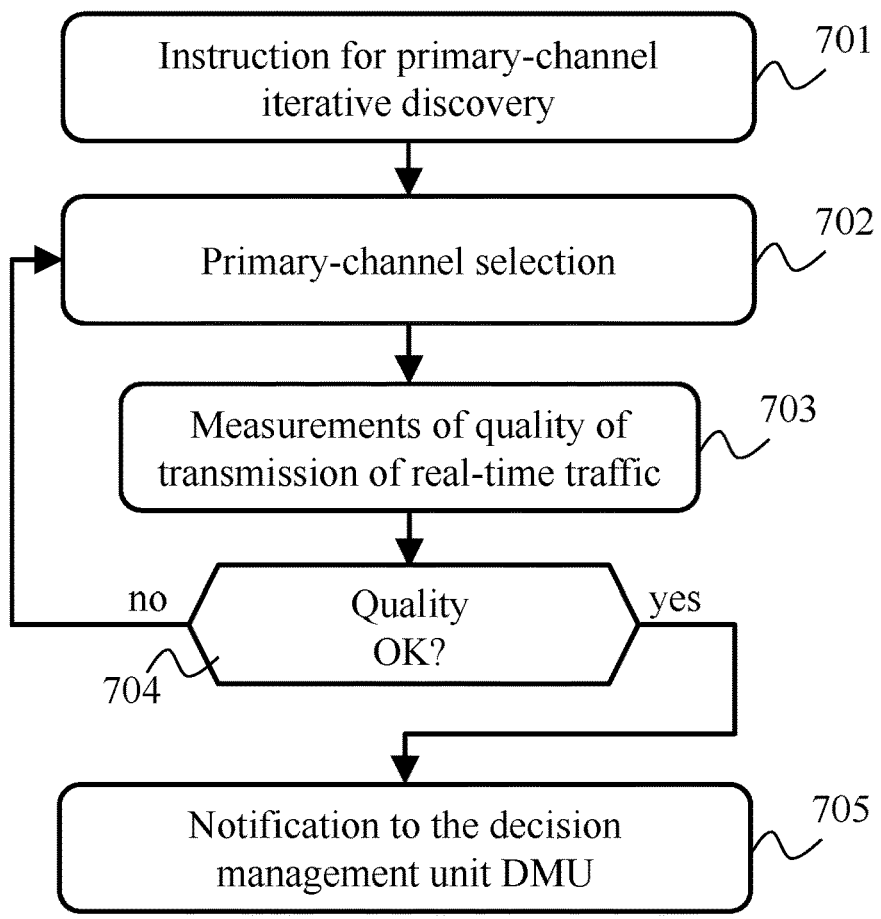
FIG. 7 illustrates schematically an algorithm for the iterative discovery of a primary channel to be selected, the algorithm being implemented by said access point.

FIG. 7 illustrates schematically an iterative discovery algorithm for the primary channel to be selected, the algorithm being implemented by the first access point AP1 111. In the iterative discovery procedure, the first access point AP1 111 tests possible primary channels by monitoring the quality of the real-time sensitive data traffic in order to determine which primary channel is appropriate.

In a step 701, the first access point AP1 111 receives, from the decision making unit DMU 100, an instruction to trigger an iterative discovery procedure. The instruction indicates to the first access point AP1 111 which are the channels on which the iterative discovery procedure must take place or, in an equivalent manner, which are the channels on which the iterative discovery procedure must not take place.

In a step 702, the first access point AP1 111 selects as the primary channel one of the channels on which the iterative discovery procedure can take place in accordance with the instruction received at step 701.

In a step 703, the first access point AP1 111 makes transmission quality measurements on the real-time sensitive data traffic, as in step 302.

In a step 704, the first access point AP1 111 checks whether the transmission quality is satisfactory for said real-time sensitive data traffic, as in step 303. If the transmission quality for said real-time sensitive data traffic is satisfactory, a step 705 is performed; otherwise step 702 is repeated by selecting as the primary channel another channel from among the channels on which the iterative discovery procedure can take place in accordance with the instruction received at step 701. If all the channels on which the iterative discovery procedure can take place in accordance with the instruction received at step 701 have been tested unsuccessfully, notification thereof is made to the decision making unit DMU 100. The first access point AP 111 then keeps the original primary channel.

In step 705, the first access point AP1 111 notifies to the decision making unit DMU 100 which primary channel has finally been selected. In the light of the way in which the decision making unit DMU 100 has established the instruction received at step 701, the primary channel of the first access point AP1 111 is henceforth the same as that of the second access point AP2 112 that created the interference on the real-time sensitive data traffic.

It should be noted that it is the decision making unit DMU 100 that chooses the primary channel of the first access point AP 111, and of all the access points AP that are connected thereto. However, the decision making unit DMU 100 does it over a long timescale in general. It is only in the event of detection of interference on the primary channel used by the first access point AP 111 when there is real-time sensitive traffic present, that the first access point AP 111 notifies the decision making unit DMU 100 so that it chooses a new primary channel (for said first access point AP 111 or for another, interfering, access point AP that is connected thereto). This makes it possible to manage the case of cloud deployment or, generally, the case of the decision making unit DMU 100 acting as an external controller.

Figure 8:
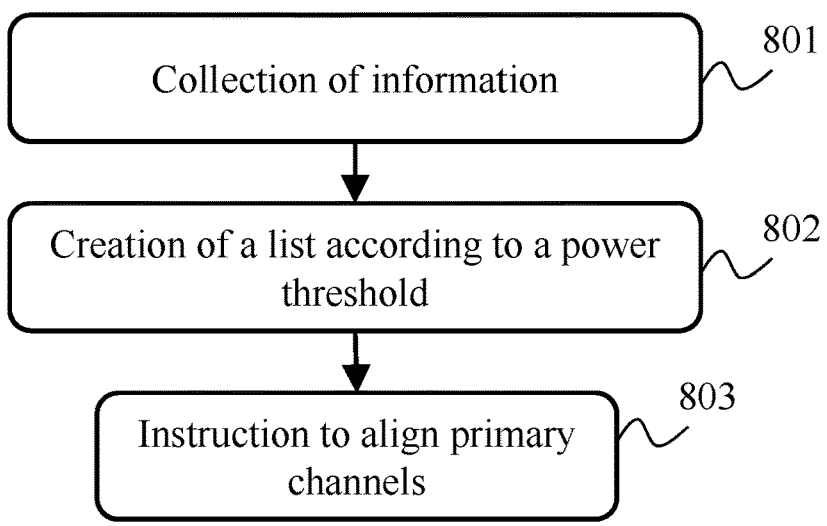
FIG. 8 illustrates schematically a primary-channel alignment algorithm, the algorithm being implemented by said decision making unit, in accordance with another approach of the invention.

FIG. 8 illustrates schematically a primary-channel alignment algorithm, the algorithm being implemented by the decision making unit DMU 100, in accordance with another approach of the invention. This other approach is suited to a deployment where a plurality of access points AP are managed by the same decision making unit DMU (as illustrated in FIG. 1B or 1D).

The decision making unit DMU 100 knows that the first access point AP1 111 is intended to support a real-time sensitive data transmission service (independently of whether or not this service is activated).

All the access points AP connected to the decision making unit DMU 100 are configured to perform a scanning, as previously described, and to indicate to the decision making unit DMU 100 each access point AP that is within radio range, and furthermore with information indicating with which power level said access point AP within radio range is detected. Although this is not necessary, the access points AP may provide information indicating which primary channel is used by each access point AP within radio range. This is because the decision making unit DMU 100 already has the possibility of knowing this information, since each access point AP in question here is connected thereto.

In a step 801, the decision making unit DMU 100 thus collects the information relating to scanning reports made by the access points AP that are connected thereto.

In a step 802, the decision making unit DMU 100 creates a list L of all the second access points AP2 112 that detect the first access point AP1 111 with a power level above a predefined threshold TH.

In a step 802, the decision making unit DMU 100 instructs all the second access points AP2 112 in the list L to use, as the primary channel, the same channel as the primary channel of the first access point AP1 111.

At each change of primary channel of the first access point AP1 111, the first access point AP1 111 informs the decision making unit DMU 100 of the newly selected primary channel. The decision making unit DMU 100 instructs all the second access points AP2 112 in the list L to use, as the primary channel, the primary channel newly selected by the first access point AP1 111. The risks of interference of the real-time sensitive data traffic supported by the first access point AP1 111, considered to have a quality of service QoS superior to or equal to any quality of service of transmissions involving each second access point AP2 112 in its respective second wireless local area network WLAN2 122, are thus limited.

The list L is updated, by re-execution of the algorithm in FIG. 8, at each new second access point AP2 112 connected to the decision making unit DMU 100. In a particular embodiment, the first access point AP1 111 may, by itself, change primary channel, in particular for reasons of radar detection, which must take place immediately. Under these conditions, the first access point AP1 111 changes primary channel and notifies it to the decision making unit DMU 100. This change of primary channel for reasons of radar detection is supposed to be temporary. The decision making unit DMU 100 then transfers this change onto the access points AP present in the list L associated with the first access point AP1 111, if their primary channels are aligned, and this in order to keep them aligned.

The invention claimed is:

1. A method for selecting a primary communication channel in a wireless communication system comprising a first access point managing a first wireless local area network and at least one second access point managing at least one respective second wireless local area network, the method comprising:
instructing, by a decision making unit comprising electronic circuitry, the first access point and each second access point to use the same primary communication channel; when the first access point communicates with a station in the context of a transmission of real-time sensitive data with a quality of service superior to or equal to any quality of service of transmissions involving each second access point in a respective second wireless local area network,
wherein transmissions in the first and second wireless local area networks are performed in accordance with a procedure of CSMA/CA type,
wherein each access point among the first and second access points implements an energy detection mechanism and a preamble detection mechanism in a context of the CSMA/CA type procedure, the energy detection mechanism being implemented for accessing the primary communication channel and for accessing each secondary communication channel associated with the primary communication channel, the preamble detection mechanism being implemented for accessing the primary communication channel and optionally for accessing each secondary communication channel associated with the primary communication channel.

2. The method according to claim 1, wherein the first access point monitors the quality of the transmission of real-time sensitive data, and triggers a primary-channel alignment procedure with the decision making unit when the quality of the transmission of real-time sensitive data drops below a predefined threshold.

3. The method according to claim 2, wherein, before triggering the primary-channel alignment procedure with the decision making unit, the first access point performs a dynamic band back-off and continues to monitor the quality of the transmission of real-time sensitive data.

4. The method according to claim 1, wherein the first access point sends to the station a scanning request requiring the return of a first scanning report listing the wireless local area networks within radio range of the station, as well as the channels occupied by the wireless local area networks within radio range of the station, in that the first access point notifies the first scanning report to the decision making unit, and wherein the decision making unit uses the first scanning report to determine which second wireless local area network or which second wireless local area networks are liable to interfere with said transmission of real-time sensitive data.

5. The method according to claim 4, wherein the first scanning report supplies information on quality of service of a dominant data traffic on each wireless local area network within radio range of the station.

6. The method according to claim 1, wherein the first access point performs a scanning of the secondary communication channels thereof and lists the wireless local area networks within radio range of the first access point in a second scanning report, wherein the first access point notifies the second scanning report to the decision making unit, and wherein the decision making unit uses the second scanning report to determine which second wireless local area network or which second wireless local area networks are liable to interfere with the transmission of real-time sensitive data.

7. The method according to claim 6, wherein the second scanning report supplies information on quality of service of a dominant data traffic on each wireless local area network within radio range of the first access point.

8. The method according to claim 1, wherein, when the decision making unit determines that a plurality of second wireless local area networks are liable to interfere with the transmission of real-time sensitive data, the decision making unit requires the first access point to perform an iterative primary-channel discovery procedure wherein the first access point tests possible primary communication channels by monitoring the quality of the transmission of real-time sensitive data in order to determine which primary communication channel is appropriate.

9. The method according to claim 1, wherein the decision making unit collects scanning reports provided by all the access points that are connected thereto, the decision making unit creates a list of all the second access points that detect the first access point with a power level above a predefined threshold, the decision making unit instructs all the second access points in the list to use, as the primary communication channel, the same channel as the primary communication channel of the first access point, and wherein, at each change of primary communication channel of the first access point, the first access point informs the decision making unit of the primary communication channel newly selected, and the decision making unit instructs all the second access points in the list to use, as the primary communication channel, the primary communication channel newly selected by the first access point.

10. The method according to claim 1, wherein the first and second wireless local area networks are of the Wi-Fi type.

11. A non-transitory storage medium configured to store a computer program comprising instructions for implementing, by electronic circuitry, the method according to claim 1, when the program is executed by the electronic circuitry.

12. A system comprising:
a decision making unit comprising electronic circuitry configured to:
perform a primary communication channel selection in a wireless communication system comprising a first access point managing a first wireless local area network and at least one second access point managing at least one respective second wireless local area network, the transmissions in the first and second wireless local area networks being performed in accordance with a procedure of the CSMA/CA type, each access point among the first and second access points implementing an energy detection mechanism and a preamble detection mechanism in the context of the CSMA/CA procedure, the energy detection mechanism being implemented in order to access the primary communication channel and to access each secondary communication channel associated with the primary communication channel, the preamble detection mechanism being implemented in order to access the primary communication channel and optionally to access each secondary communication channel associated with the primary communication channel; and
instruct the first access point and each second access point to use the same primary communication channel, when the first access point communicates with a station in the context of a transmission of real-time sensitive data with a quality of service superior to or equal to any quality of service of transmissions involving each second access point in a respective second wireless local area network.

13. A method for selecting a primary communication channel in a wireless communication system comprising a first access point managing a first wireless local area network and at least one second access point managing at least one respective second wireless local area network, the transmissions in the first and second wireless local area networks being performed in accordance with a procedure of the CSMA/CA type, the method comprising:
implementing, by each access point among the first and second access points, an energy detection mechanism and a preamble detection mechanism in the context of the CSMA/CA procedure, the energy detection mechanism being implemented for accessing the primary communication channel and for accessing each secondary communication channel associated with the primary communication channel, the preamble detection mechanism being implemented for accessing the primary communication channel and optionally for accessing each secondary communication channel associated with the primary communication channel,
receiving instruction from electronic circuitry for the first access point and each second access point to use the same primary communication channel when the first access point communicates with a station in the context of a transmission of real-time sensitive data with a quality of service superior to or equal to any quality of service of transmissions involving each second access point in a respective second wireless local area network.

* * * * *